Patented Jan. 5, 1937

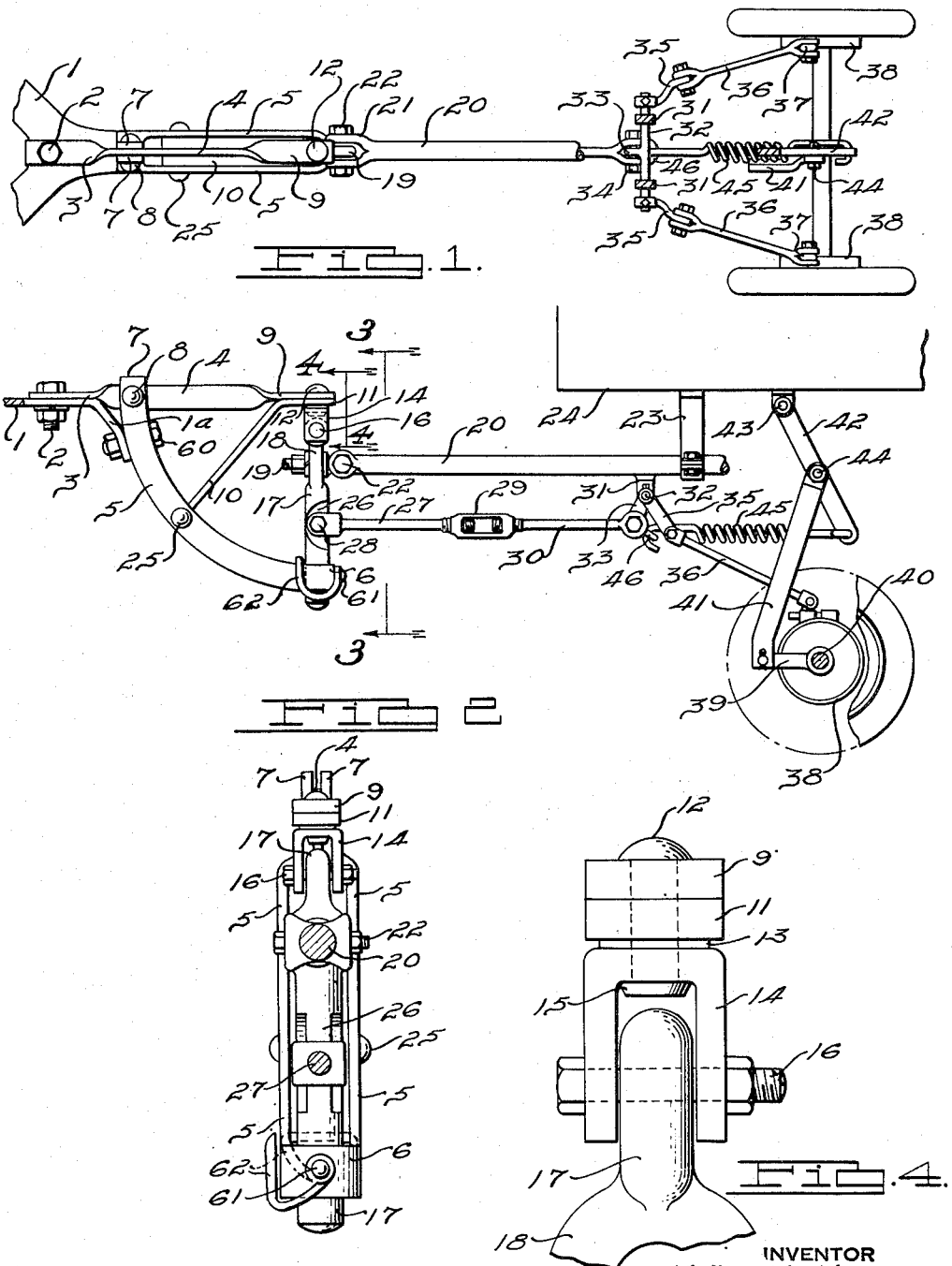

2,066,893

UNITED STATES PATENT OFFICE 2,066,893

TRAILER HITCH AND BRAKE

John V. Linsowe, Flint, Mich.

Application November 23, 1935, Serial No. 51,216

5 Claims. (Cl. 188—142)

This invention relates to trailer hitches and the object of the invention is to provide a hitch for connecting a trailer to an automobile, the device being so arranged that when the brakes are applied to the automobile the trailer brakes are also automatically applied and upon release of the automobile brakes, the trailer brakes are automatically released.

Another object of the invention is to provide a trailer hitch including a brake mechanism which is automatically applied when the trailer tends to run up on the automobile or tends to increase its speed over that of the automobile.

A further object of the invention is to provide a trailer hitch in which the load on the trailer increases the pressure required to operate the brake so that the brake actuating mechanism is compensated with the load on the trailer.

A further object of the invention is to provide a leverage action by which a tension is applied to the brake actuating mechanism as the load is increased on the trailer, the tension applied being in proportion to the load.

Another object of the invention is to provide a trailer hitch in which relative movement of the trailer in one direction in relation to the traction device will apply the brakes to the trailer and in which relative movement of the trailer in the opposite direction to the traction device will release the brakes on the trailer.

These objects and the several novel features of the invention are hereinafter more fully described and claimed and the preferred form of construction by which these objects are attained is shown in the accompanying drawing in which—

Fig. 1 is a plan view of a trailer hitch embodying my invention.

Fig. 2 is a side elevation thereof.

Fig. 3 is an enlarged section taken on line 3—3 of Fig. 2.

Fig. 4 is an enlarged section taken on line 4—4 of Fig. 2.

In connecting a trailer to an automobile or other traction device, the automobile is usually provided with a bracket 1 secured to the rear thereof having an aperture through which the bolt 2 may be inserted. In applicant's device, a member 3 is provided having an aperture through which the bolt 2 may also be inserted to connect the trailer to the automobile or other traction device. This member 3 is provided with a vertical portion 4 formed by a half-twist and an arcuate bracket 5 is provided which is of elongated U shape in form and is provided with a return bend at 6. The ends 7 of this bracket 5 are bent inwardly and are secured to the portion 4 by the rivet 8. The bracket 1 is provided with a depending end 1a and a bolt 60 extends between the sides of the arcuate guide 5 and through the end 1a and is provided with a nut thereon by which the bracket end 1a may be firmly secured to the device. The two bolts 2 and 60 firmly secure the device to the bracket 1 and prevent side sway.

The portion 4 is provided with an end 9 which is formed by a half-twist and a bracket 10 is also provided having an end 11 co-extensive with the end 9 and a rivet 12, shown more particularly in Fig. 4, is inserted through the ends 9 and 11. A spacer washer 13 is provided beneath the end 11 and an inverted U shaped bracket 14 is provided so that the rivet 12 extends through the spacer washer 13 and through the bracket 14 and is provided with an upset end 15 to secure the bracket 14 to the ends 9 and 11.

By this arrangement, the bracket 14 may turn on the rivet 12. A bolt 16 extends through the lower ends of the inverted U shaped bracket 14 and a king bolt 17 is pivotally mounted on the bolt 16, as shown in Fig. 4. This king bolt 17 is provided with a flattened portion 18 and an eye-bolt 19 is secured in the aperture in the center of the flattened portion 18. The tongue 20 of the trailer is provided with a bifurcated end 21 extending on opposite sides of the eye-bolt 19 and a bolt 22, shown in Figs. 1 and 2, extends through the bifurcated end 21 and through the eye-bolt 19 so that the tongue 20 is pivotally mounted on the bolt 22 and the eye-bolt 19 may turn on its axis in the king bolt 17. The tongue 20 is secured in a bracket 23, shown in Fig. 2, and this bracket 23 is secured to the body 24 of the trailer. The bracket 10, shown in Fig. 2, extends downwardly and about a spacer rivet 25 and spaces the two sides of the arcuate bracket 5 apart. The king bolt 17 is provided with a flattened portion 26 and a rod 27 is provided with a bifurcated end having a bolt 28 extending through the flattened portion 26. The rod 27 is threaded into a turnbuckle 29 and a rod 30 is also threaded into this turnbuckle. A bracket 31 is secured to the underside of the tongue 20 and is provided with depending ends in which a shaft 32 is rotatably mounted. This shaft 32 is provided with a depending arm 33 at the center and the rod 30 is provided with a bifurcated end which is connected to the arm 33 by the bolt 34. An arm 35 is secured to each end of the shaft 32, as shown in Fig. 1, and a rod 36 is pivotally connected to each arm 35 at one end and is connected to a brake operating lever 37 at the opposite end. The brake operating levers are arranged for operating the brakes 38 provided on the trailer wheels.

At the center, an arm 39 extends outwardly from the axle 40 of the trailer and an arm 41 is pivotally connected to the arm 39. A second arm 42 is provided which is pivotally connected to the trailer body at 43 and the arm 41 is pivotally connected at 44 intermediate the ends of the arm 42. A spring 45 is connected at one end to the lower end of the arm 42 and the opposite end of the spring is connected to an extension 46 on the rod 30. The trailer body 24 is supported on the axle 40, though not here shown, by means of the usual leaf-springs provided for this purpose, though the springs are not here shown in order to prevent confusion.

The operation of the device will be understood more readily from Fig. 2. In this figure, the device is considered to be drawn to the left by the automobile or other traction device. In this position, the curved portion 6 of the arcuate guide forms a stop for the lower end of the king bolt 17 and the tongue 20 pulls the trailer. Should the trailer tend to move forward faster than the automobile, the tongue 20 pushes the king bolt 17 forward on the pivot 16 and as this king bolt 17 is moved forward, a leverage is applied in drawing the rods 27 and 30 forward to a greater extent than the tongue 20 moves forward. This forward movement of the rods 27 and 30 turns the shaft 32 on its axis and by means of the arms 35, the arms 36 are pulled forward to apply the brakes to the wheels of the trailer. As the brakes are applied, the king bolt 17 is pulled back to the position shown in Fig. 2, at which time, the brakes are again released. In this case, it will be noted that if the brakes are applied to the automobile, the trailer tends to move forward in relation to the automobile and applies the brakes to the trailer, thus controlling the movement of the trailer in accordance with the movement of the automobile.

As a load is placed on the trailer, the arms 41 and 42 are turned on their pivots thus moving the lower end of the arm 42 to the right of Fig. 2 and increasing the tension of the spring 45. This increases the pressure required to move the trailer forward in relation to the automobile and thus compensates the load on the trailer with the braking action due to the fact that the tension of the spring resists forward movement of the rods 27 and 30. In this arrangement, the greater the load applied to the trailer, the greater the tension applied to the spring 45. The trailer may be disconnected from the automobile by removing the bolts 2 and 60 or by removing the bolt 16 in the bracket 14 to allow removal of the king bolt 17 from the arcuate guide 5.

In order to allow the trailer to be backed up, a rivet 61 is provided in the end of the arcuate guide 5 and a hook 62 is pivotally mounted on this rivet so that it may be swung from the position shown in Fig. 2 to that shown in Fig. 3, at which time, the king bolt 17 is locked in position and by backing up the traction device, the trailer is moved backwardly without applying the brakes.

From the foregoing description, it becomes evident that the device is very simple and efficient in operation, will not easily get out of order, is automatic in operation and provides a device which accomplishes the objects described.

Having thus fully described my invention, its utility and mode of operation, what I claim and desire to secure by Letters Patent of the United States is—

1. In a trailer hitch and brake, a member having an arcuate U shaped guide, a king bolt pivoted on the said member and swingable to a limited extent in said arcuate guide, a trailer having a pair of trailer wheels and brakes therefor, a tongue on the trailer connected to the king bolt, a brake actuating rod connected to the king bolt at a greater distance from the pivot of the king bolt than the trailer tongue connection, the brake actuating mechanism being operated upon forward swinging movement of the king bolt and means resisting forward movement of the brake actuating rod and means for increasing the resistance in proportion to the load on the trailer.

2. In a trailer hitch and brake, a member having an arcuate guide, a king bolt pivoted on said member and swingable to a limited extent in said arcuate guide, a trailer having a pair of trailer wheels and brakes therefor, a tongue on the trailer connected to the king bolt at a distance from its pivot, a brake actuating rod connected to a king bolt at a greater distance from the pivot of the king bolt than the trailer tongue connection, the brake actuating mechanism being operated upon forward swinging movement of the king bolt, a spring connected to the brake actuating rod and means for increasing the tension of the spring in accordance with the load of the trailer.

3. In a trailer hitch and brake, a member adapted to be pivotally connected to a traction device, an arcuate guide carried by the said member, a king bolt pivoted on said member and turnable on its pivot in the arcuate guide, a trailer having a tongue pivotally connected to the king bolt, a brake actuating rod pivotally connected to the king bolt adjacent the free end thereof and a brake mechanism adapted to be operated by the brake actuating rod upon turning movement of the king bolt forward in the arcuate guide.

4. In a trailer hitch and brake, a member adapted to be pivotally connected to a traction device, an arcuate guide carried by the said member and extending therebeneath, a king bolt pivoted on said member and turnable on its pivot through the arcuate guide, a trailer having a tongue pivotally connected to the king bolt at a distance from its pivot, a brake actuating rod pivotally connected to the king bolt at a greater distance from the king bolt pivot than the trailer tongue and a brake mechanism adapted to be operated by the brake actuating rod upon forward turning movement of the king bolt by the trailer tongue.

5. In a trailer hitch and brake, a member having an arcuate guide provided with a stop at one end, a king bolt pivotally mounted on said member and swingable through the arcuate guide, a trailer having a tongue connected to the king bolt and a brake actuating rod connected to the king bolt, the arrangement being such that as the king bolt is swung forward by the trailer tongue, the brake actuating rod is moved forward to a relatively greater extent.

JOHN V. LINSOWE.